US005598526A

United States Patent [19]

Daniel et al.

[11] Patent Number: 5,598,526

[45] Date of Patent: Jan. 28, 1997

[54] METHOD AND SYSTEM FOR DISPLAYING IMAGES USING A DYNAMICALLY RECONFIGURABLE DISPLAY MEMORY ARCHITECTURE

[75] Inventors: Andrew Daniel, San Jose; Spencer Greene, Palo Alto, both of Calif.

[73] Assignee: Alliance Semiconductor Corporation, San Jose, Calif.

[21] Appl. No.: 393,052

[22] Filed: Feb. 23, 1995

[51] Int. Cl.[6] .................... G06F 12/00

[52] U.S. Cl. .................... 395/507; 395/853; 395/515; 395/521; 345/27; 345/185; 345/203

[58] Field of Search .................... 395/162–166, 395/412, 853; 345/27, 28, 133, 185, 189, 190, 203

[56] References Cited

U.S. PATENT DOCUMENTS 5,367,628 11/1994 Ote et al. .................... 395/164

OTHER PUBLICATIONS

"Display Controller Simplifies Programming" by Beckwith et al, Electronic Design, May 14, 1987.

*Primary Examiner*—Kee M. Tung

*Attorney, Agent, or Firm*—Limbach & Limbach L.L.P.

[57] ABSTRACT

A method and apparatus for dynamically regrouping display memory chips to efficiently implement 8-bit, 16-bit, and 24-bit per pixel display solutions is provided. The invention permits the implementation of 24-bit per pixel solutions in which 24-bit pixels do not straddle addressable regions, but without requiring the use of a unused byte of display memory per 24-bit pixel.

8 Claims, 9 Drawing Sheets

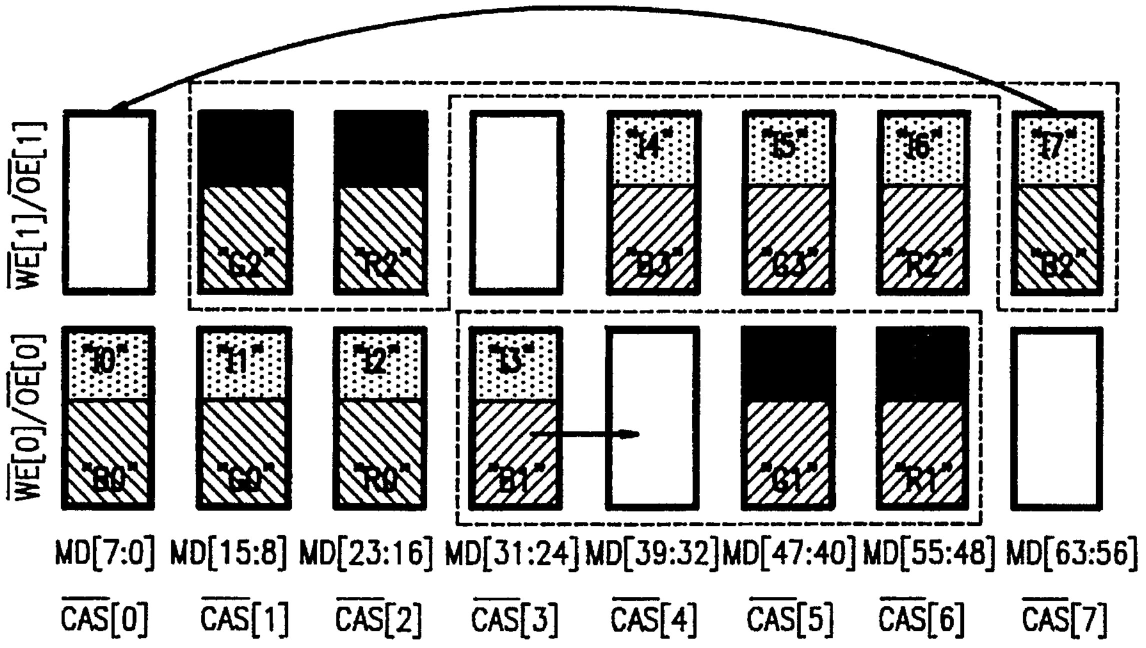
FIG. 5A
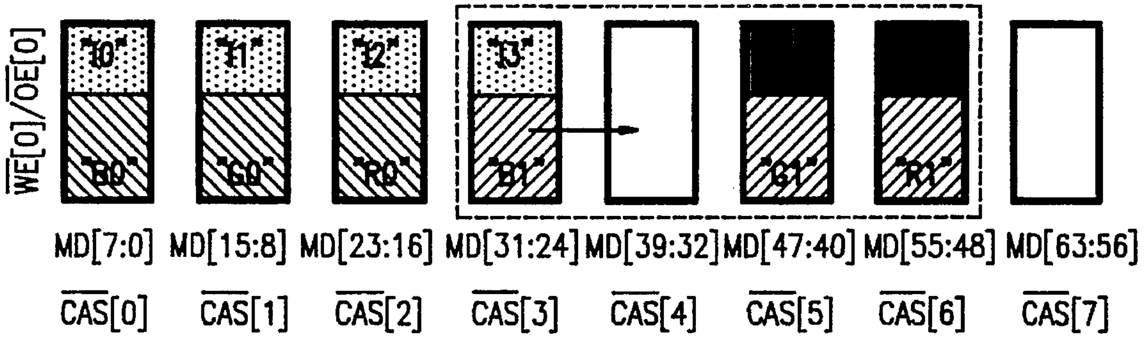
FIG. 5B
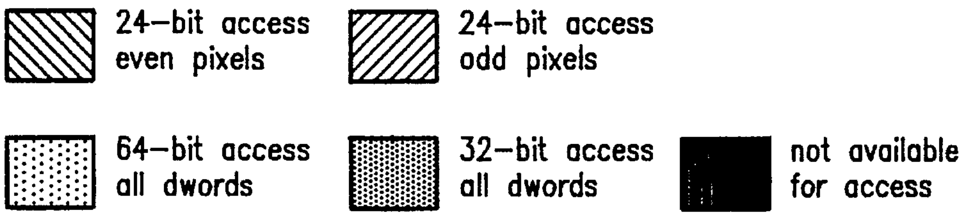
(KEY FOR FIG. 5A AND FIG. 5B)

METHOD AND SYSTEM FOR DISPLAYING IMAGES USING A DYNAMICALLY RECONFIGURABLE DISPLAY MEMORY ARCHITECTURE

BACKGROUND OF THE INVENTION

1. Field of the Invention

The present invention relates to graphics display systems and, in particular, to a graphics display system that may be dynamically reconfigured to support different display modes.

2. Discussion of the Prior Art

In a conventional computer graphics system, an electronic image of the screen is stored in a number of integrated circuit memory chips, typically random access memory (RAM). Taken together, these chips are known as the "display memory."

The display screen is composed of a number of dots, or "pixels", each of which can be independently set to any of a number of colors. The color of each pixel is defined by a plurality of pixel data bits stored in the display memory. "Pixel depth" describes the number of bits of pixel data stored in the display memory for each pixel on the screen. For n-bit pixel depth, the color of each pixel is encoded by an n-bit value; therefore, there are $2^n$ possible colors for a selected pixel.

For a given amount of physical display memory available for graphics storage, more bits per pixel (i.e., greater pixel depth) means fewer pixels can be stored (i.e., smaller resolution). For the same graphics system, different users may choose to use different pixel depths and resolutions; or, the same user may at different times wish to choose different pixel depths and resolutions; or, in some systems, the user may choose to display different parts ("windows") of the screen at the same time using different pixel depths. A particular pixel depth/resolution combination is known as a "display mode." Currently available graphics controllers permit switching among different display modes.

Another element in a conventional computer graphics system, a graphics controller, communicates with the display memory to perform primary pixel data processing and display functions. For example, the controller modifies pixel data stored in the display memory under commands from an associated host computer ("display memory update"). Also, the controller periodically causes pixel data representing the current visible screen to be read from the display memory and displayed on the screen ("screen refresh").

In a common display memory format known as "direct color", the data for each pixel consists of a number of bits divided into three groups which represent Red, Green and Blue intensity components of the pixel color. One common direct color format is 24-bit "true color", which consists of 8 bits (one byte) each of Red, Green and Blue intensity levels. Other common direct color formats use 15 or 16 bits per pixel. Formats using 15 bits per pixel are generally padded with an extra unused bit and stored using 16 bits per pixel.

FIG. 1 shows a "5:6:5" display memory format wherein four 16-bit pixels P0–P3 are stored in a 64-bit wide memory "word." The "5:6:5" nomenclature means that 5 bits (R0) of each pixel (P0) define Red intensity, 6 bits (G0) define Green intensity, and 5 bits (B0) define Blue intensity.

An important characteristic of the FIG. 1 example is that the physical storage space of the display memory is used efficiently. That is, first, each 64-bit data word storage location in the display memory stores an integer number of pixels (i.e., four, in this case). Second, no pixel's data straddles two 64-bit words in memory. Third, for each 64-bit data word storing pixel information, 100% of the storage space is utilized (i.e., there is no wasted display memory storage space). These three advantages are present whenever the physical width of the display memory data word is an integer multiple of the pixel depth, as in the FIG. 1 example in which the 64-bit data word stores exactly four 16-bit "5:6:5" format pixels (P0–P3).

Many conventional computer graphics systems utilize a "packed" 24-bit pixel display mode, i.e., a mode in which the width of the data word storage location in the display memory is not an integer multiple of the pixel depth.

24-bit pixel formats may be implemented in a number of ways. For example, in the "RGBR" or "packed pixel" implementation shown in FIG. 2A, 24-bit pixels are stored across a 64-bit data word using every bit of the word. In the example shown in FIG. 2A, two 24-bit pixels and two 8-bit portions of a third 24-bit pixel are stored. In this implementation, although display memory storage space is not wasted, a pixel may straddle two display memory data words. This results in a complicated address generation and control structure, and poor performance, because a write operation to update display data for one pixel (i.e., one that straddles two data words) may require two memory accesses (compared to one memory access if each pixel is guaranteed to be stored in a single data word).

FIG. 2B shows another possible implementation of 24-bit color. In this implementation ("RGBX"), a group of four consecutive bytes (32 bits) represents each pixel, with one of the four 8-bit bytes ("X") ignored. No pixel straddles two words and all pixels have the same alignment. Addressing is simple and performance is often better than in the RGBR method. However, this method is wasteful of physical memory when the system is operating in 24-bit modes since one quarter of the display memory contains unused data.

FIG. 2C shows a 24-bit implementation ("RGB0") that is similar to RGBX. As in the RGBX method, each 64-bit access addresses two 24-bit pixels. The remaining 16 bits are ignored by the graphics controller and are, in fact, "holes" in the memory system where no physical memory is present. The advantage over the RGBX method is that 25% less physical memory is required. However, the RGB0 implementation, with 16 bits of memory "missing" from each of the 64-bit data words in the display memory bank, does not permit reconfiguration of the display memory for other pixel depths, such as the 16-bit "5:6:5" mode discussed above in conjunction with FIG. 1, because the physical display memory storage space is not "contiguous."

While the RGB0 method is currently used in systems which operate exclusively in the 24-bit mode, because of the reconfigurability problem, it has not been practical for use with general-purpose, multi-mode controllers. It is this limitation of the RGB0 display mode that is addressed by the present invention.

SUMMARY OF THE INVENTION

The present invention provides a display memory architecture that implements a solution by which 16-bit and 24-bit pixel regions share the display memory without any of the display memory wastage of the RGBX display mode or the pixel straddling problems of the RGBR display mode, but while still permitting full 32-bit performance unavailable with the RGB0 display mode. Critical to this invention is the dynamic recombination of data in particular random access memories (RAMs) to form 16-bit or 24-bit pixels.

Other features and advantages of the present invention will become apparent and be appreciated by reference to the following detailed description which should be considered in conjunction with the accompanying drawings.

DESCRIPTION OF THE DRAWINGS

FIG. 5A provides a representation of a connection scheme between a graphics controller and associated RAMs according to the present invention, using commonly understood pin identifications.

FIG. 5B provides a representation of a connection scheme between a graphics controller and associated RAMs according to the present invention, using only one bank of memory.

DETAILED DESCRIPTION OF THE INVENTION

Figure 1:
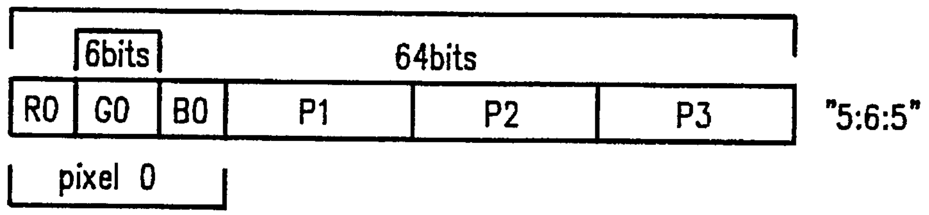
FIG. 1 (PRIOR ART)
FIG. 1 provides a representation of a 16-bit "5:6:5" pixel display format stored in a display memory comprising 64-bit data words.
Figure 2A:
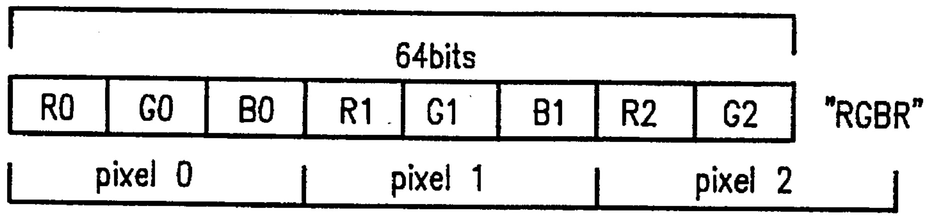
FIG. 2A (PRIOR ART)
FIG. 2A provides a representation of a 24-bit "RGBR" pixel display format stored in a display memory comprising 64-bit data words.
Figure 2B:
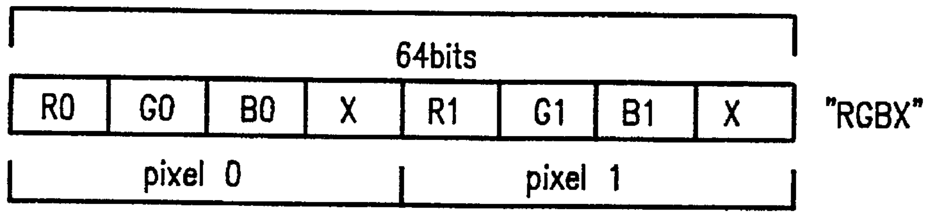
FIG. 2B (PRIOR ART)
FIG. 2B provides a representation of a 24-bit "RGBX" pixel display format stored in a display memory comprising 64-bit data words.
Figure 2C:
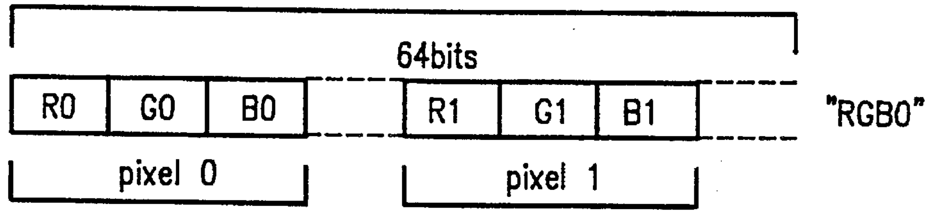
FIG. 2C (PRIOR ART)
FIG. 2C provides a representation of a 24-bit "RGB0" pixel display format stored in a display memory comprising 64-bit data words.
Figure 3:
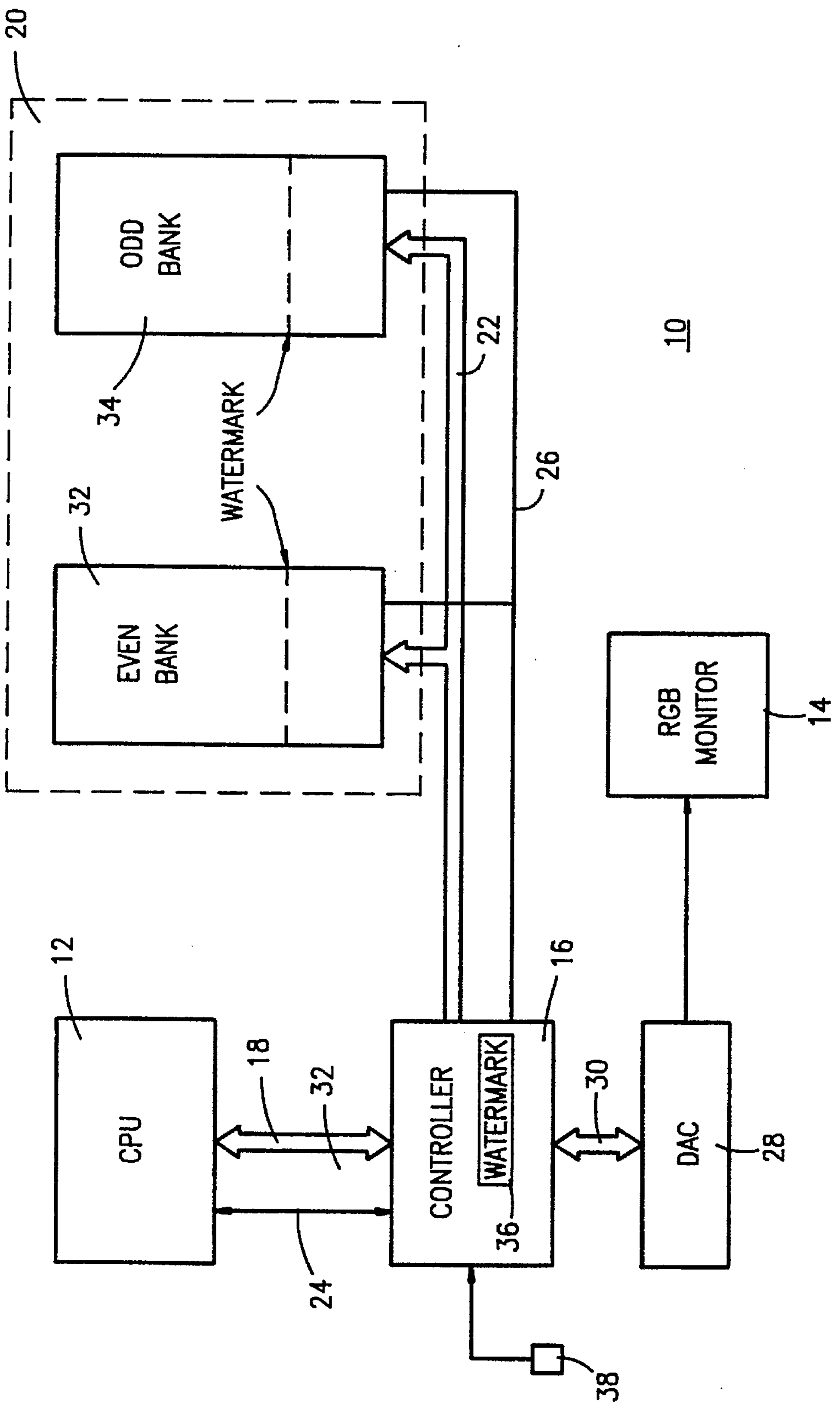
FIG. 3 is a block diagram illustrating a dynamically configurable display memory system in accordance with the present invention.

FIG. 3 shows a graphics display system 10 that includes a central processing unit (CPU) 12 that writes pixel display data to be displayed on a RGB monitor 14 to a graphics controller 16 on a CPU data bus 18. The graphics controller 16 stores the pixel display data to a DRAM display memory 20 via a controller data bus 22. While the embodiment of the invention shown in FIG. 3 employs a display memory 20 composed of DRAMs, it should be understood that other types of RAM may be utilized, including SRAMs and VRAMs. The CPU 12 also provides certain high level graphics command signals 24 to the graphics controller 16 to process the pixel display data stored in the display memory 20.

The graphics controller 16 retrieves pixel display data from the display memory 20 via controller data bus 22 utilizing address references on address bus 26 that identify a 64-bit data word storage location in the display memory 20. The graphics controller 16 processes the retrieved pixel display data based on the CPU command signals 24 and writes the resulting new pixel display data back to the display memory 20 via the controller data bus 22.

The pixel display data stored in the display memory 20 is displayed on the RGB monitor 14 through a color look-up table and a random access memory digital-to-analog converter (DAC) circuit 28, or through the random access memory DAC circuit 28 directly.

The graphics controller 16 also reads pixel display data from the display memory 20 via the controller data bus 22 and sends it to the DAC circuit 28 via the display bus 30 to meet the periodic refresh requirements of the RGB monitor 14.

The FIG. 3 embodiment also shows the graphics controller 16 as being responsive to a user provided state bit 38 that selects between a 24-bit RGB display mode and a contiguous display mode (e.g. 8, 16, or 32-bit). As explained in greater detail below, when the system 10 is set in the 24-bit RGB display mode, display memory accesses within a particular address range are mapped directly, while other accesses in a different address range are mapped by steering bytes to particular physical memory locations ("byte steering").

Toward this end, FIG. 3 shows the graphics controller 16 as including a watermark register 36 that specifies a memory location ("watermark") above which all display memory accesses are in the direct mapping mode, even when the 24-bit RGB mode is enabled by the state bit 38. This is beneficial because some data stored in display memory 20, such as cursor patterns, monochrome fonts, and motion video windows are more easily implemented with contiguous bytes of storage. Those skilled in the art will appreciate that the watermark register could be replaced by a fixed watermark location or by other methods of discriminating between 24-bit data and contiguous data in memory.

Thus, the present invention provides a graphics display memory system that is dynamically configurable on two levels. First, the invention provides a method for automatically accessing a single display memory system using either a direct mapping organization or an organization with byte steering, the selection being based upon the logic state of the state bit 38. Second, the invention provides for organization of the single display memory system into a region of direct mapping and a region of byte steered operation when the state bit is set to select the organization with byte steering format.

In the embodiment of the invention illustrated in FIG. 3, the display memory 20 includes two display memory banks, an even address memory bank 32 and an odd address memory bank 34. Each of the even and odd address banks includes a plurality of 64-bit data word storage locations. As stated above, the address space of each memory bank 32, 34 is divided into two sections; a 24-bit data storage section and a non-24-bit data storage section. The "watermark" address stored in the watermark register 36 delineates the two sections. Thus, when the state bit 38 defines the system as being in the 24-bit RGB mode, accesses to the 24-bit data storage section are mapped with byte steering, while accesses to the non-24-bit data storage section are direct. Of course, when the state bit 38 defines direct operation, all accesses to display memory 20 are direct.

Implementation of a method of mapping data transfers on the 64-bit display data bus 22 connected between the graphics controller 16 and the display memory storage element 20 will now be described in conjunction with FIGS. 4A–4F. (Those skilled in the art will recognize and appreciate that the description and illustration of "direct" mapping such as set forth in FIG. 4C and of "byte steered" mapping as set forth in FIGS. 4A and 4B is a semantic choice, and that a functionally identical system could be provided in which 24-bit accesses are directly mapped and non-24-bit accesses are byte steered.)

The display data bus 22 includes 8 separate 8-bit data paths (data bytes). As described above, the display memory storage element 20 includes even and odd display memory banks 32 and 34, each of which, when the system 10 is set in the 24-bit RGB mode, is divided into a 24-bit data storage region and a non-24-bit data storage region.

Figure 4A:
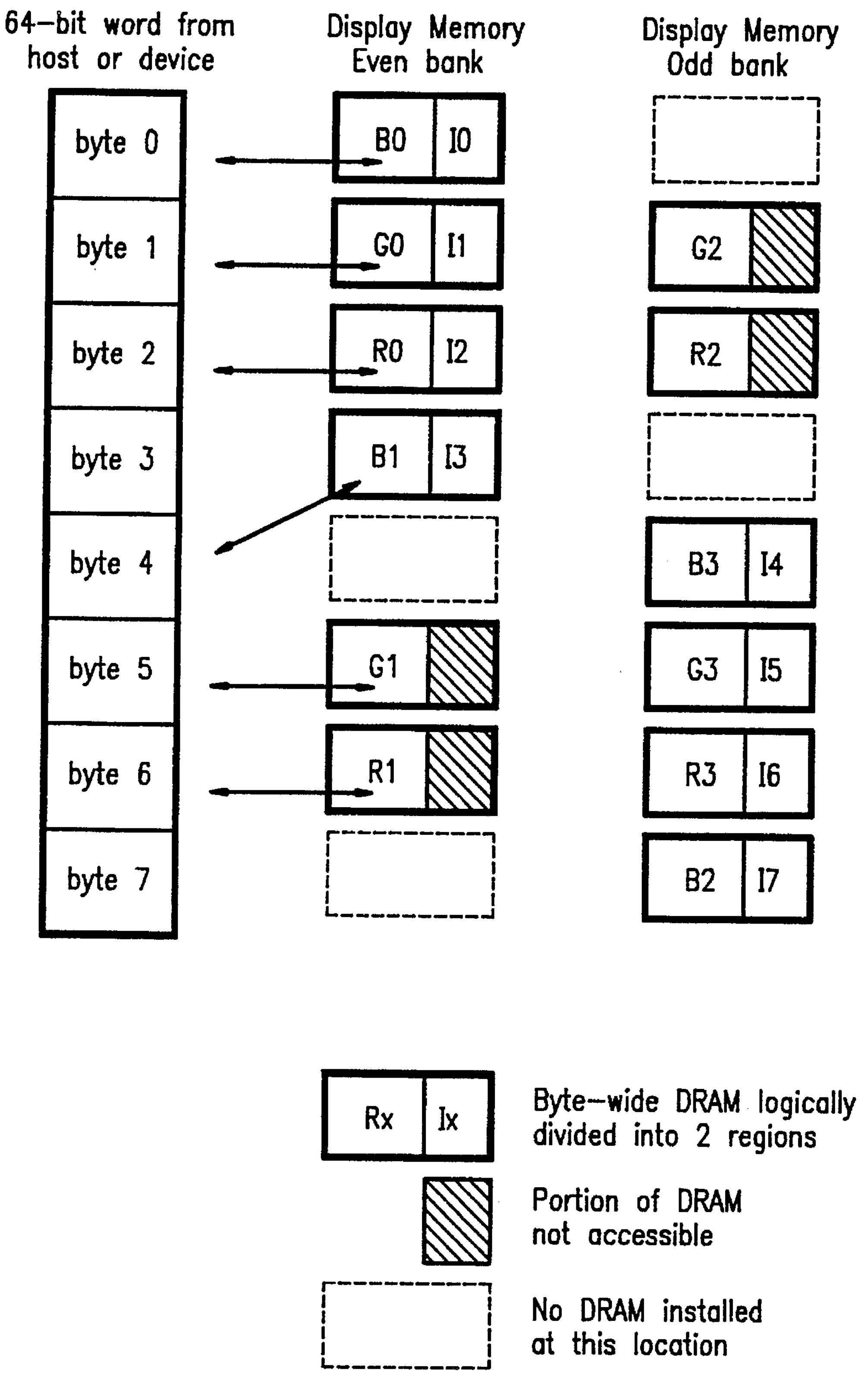
FIG. 4A provides a representation of a 64-bit read or write access to an even address in the 24-bit pixel region of the display memory of the FIG. 3 system.

With reference to FIG. 4A, for a 64-bit read or write operation to an even address in the 24-bit pixel region of the display memory 20, the six RGB data bytes on the display data bus 22 are mapped to six memory bytes in the even memory bank 32 in the following manner: data bytes 0–2 map to memory bytes 0–2, data byte 4 maps to memory byte 3, and data bytes 5 and 6 map to memory bytes 5 and 6. During write operations, any byte enables from the host CPU 12 are steered along with the data. During read operations, bytes 3 and 7 of the display data bus 22 will return unknown or otherwise unuseable data.

Figure 4B:
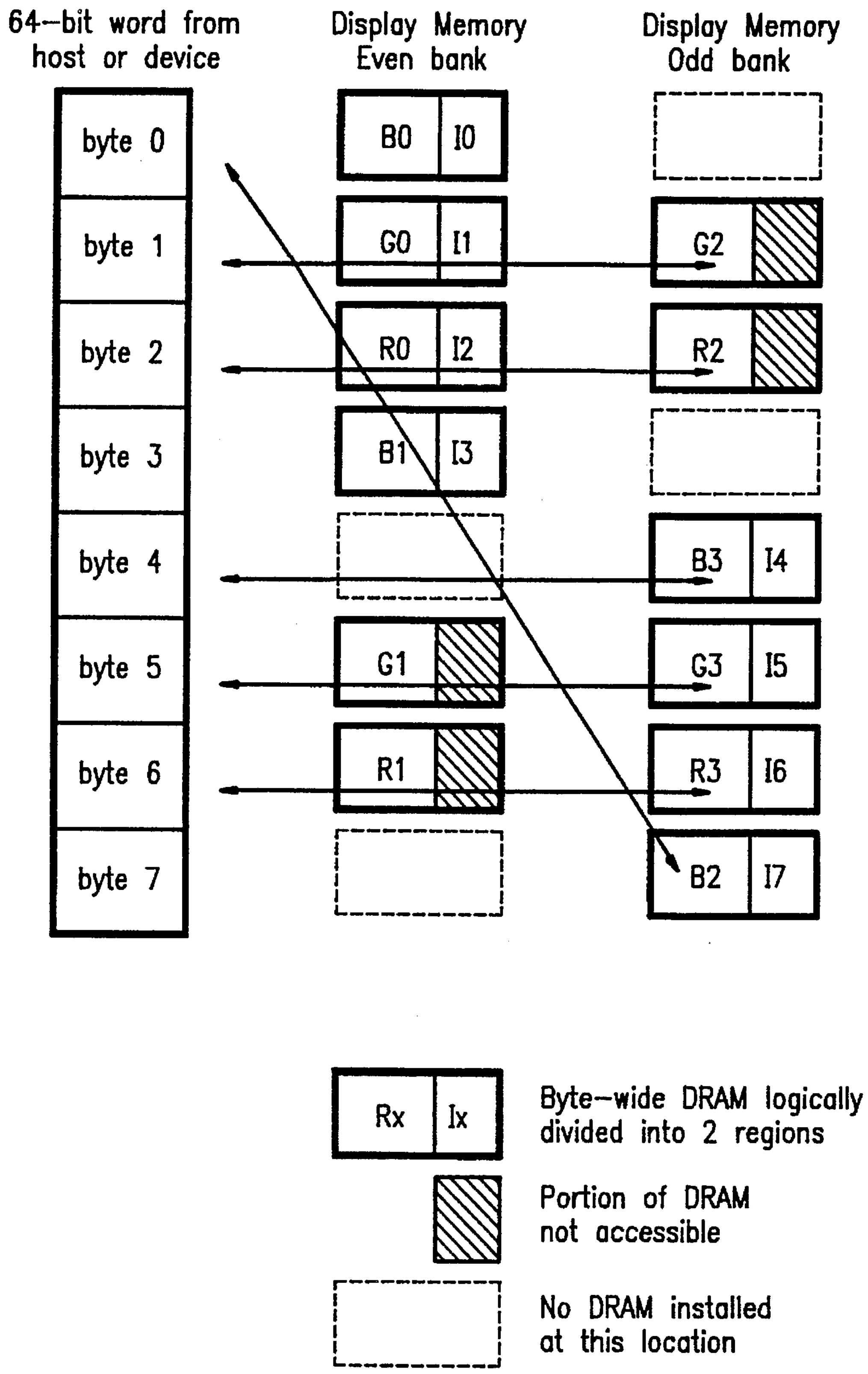
FIG. 4B provides a representation of a 64-bit read or write access to an odd address in the 24-bit pixel region of the display memory of the FIG. 3 system.

Referring to FIG. 4B, for 64-bit read or write operations to an odd address in the 24-bit pixel region, the six RGB data bytes on the display data bus 22 are mapped to six memory bytes in the odd memory bank 34 as follows: data byte 0 maps to memory byte 7, data bytes 1 and 2 map to memory bytes 1 and 2, and data bytes 4–6 map to memory bytes 4–6. Again, any byte enable from the host CPU 12 is steered along with the data. During read operations, bytes 3 and 7 on the display data bus will return unknown or otherwise unuseable data.

As stated above, those skilled in the art will appreciate that the concepts of the present invention may be applied to a single-bank implementation of display memory 20, wherein both even and odd addresses access the same memory bank. In a single-bank implementation, accesses to the non-24-bit region are 32-bits at a time and any 64-bit access is performed in two cycles of the host CPU 12.

Figure 4C:
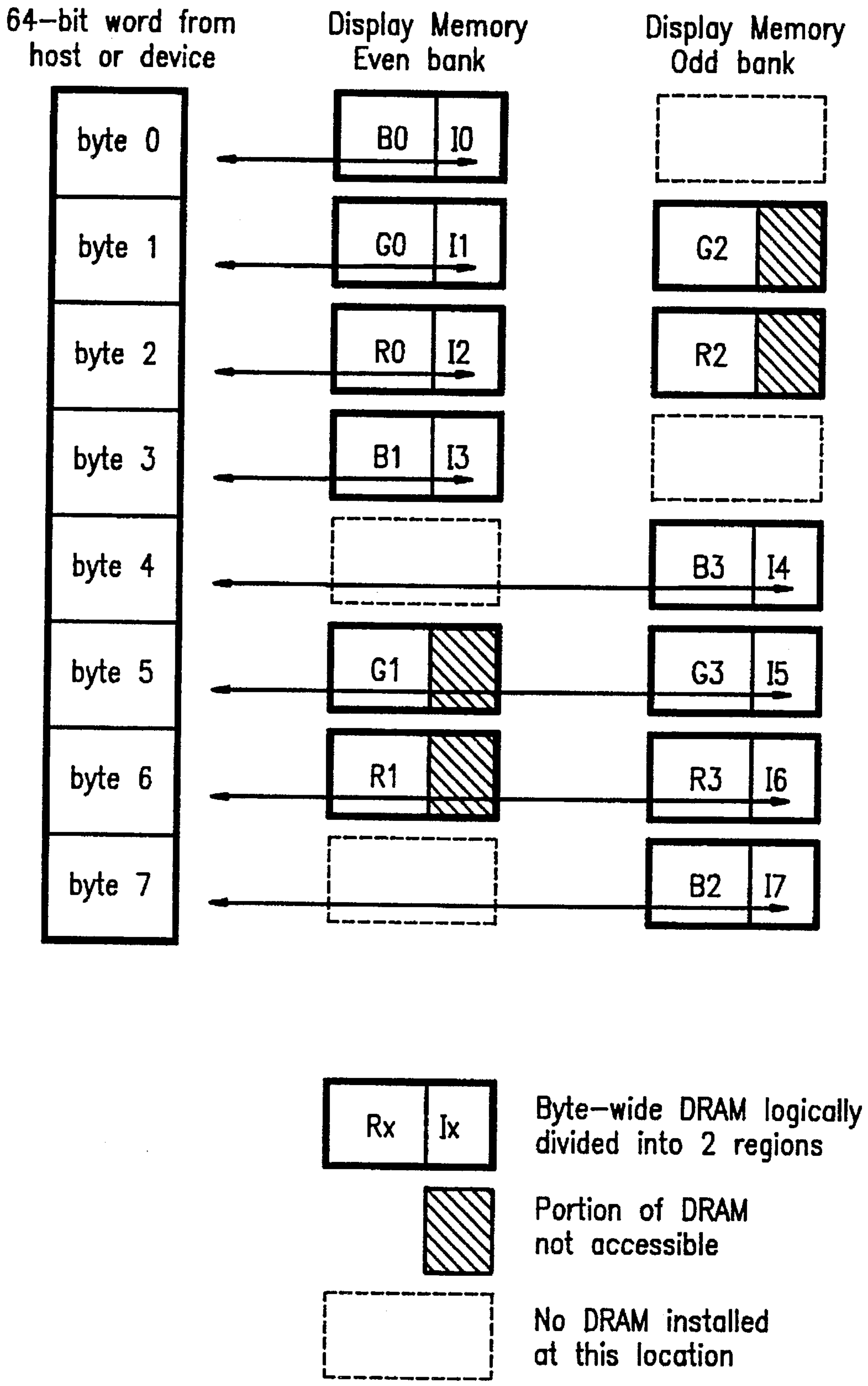
FIG. 4C provides a representation of a 64-bit read or write access to an address in the non-24-bit pixel region of the display memory of the FIG. 3 system.

With reference to FIG. 4C, for 64-bit read and write operations to addresses in the non-24-bit regions of display memory 20, data bytes 0–3 of the display data bus 22 map to memory bytes 0–3 of the even memory bank 32 and data bytes 4–7 map to memory bytes 4–7 of the odd memory bank 34.

Figure 4D:
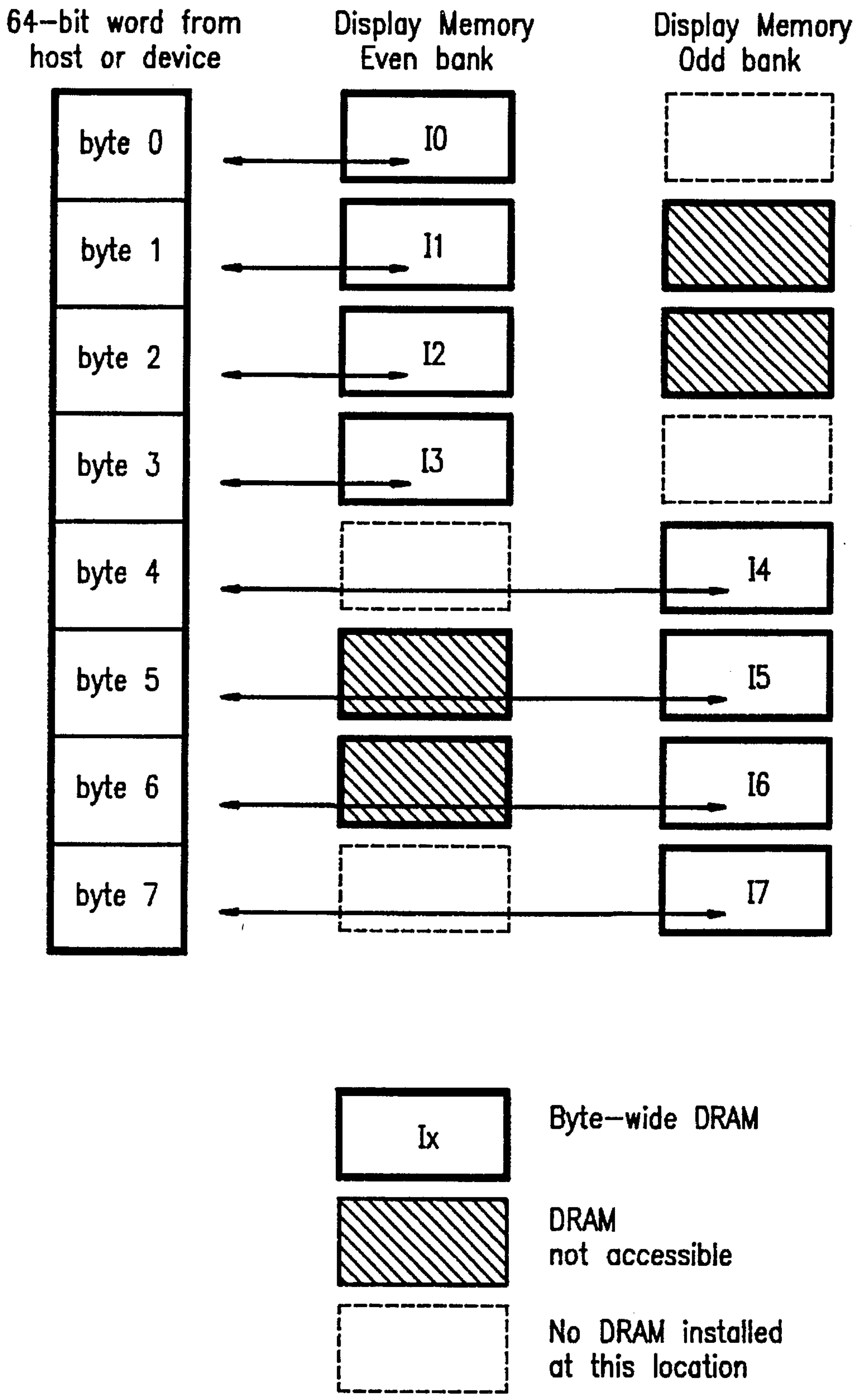
FIG. 4D provides a representation of a 64-bit read or write access to the display memory at the FIG. 3 system with the 24-bit mode disabled.

With reference to FIG. 4D, when the system is configured by state bit 38 to be in the direct mode, i.e., the 24-bit RGB mode is disabled, all read and write operations are direct (i.e., not byte steered). That is, data bytes 0–3 on the display data bus 22 map to memory bytes 0–3 in the even memory bank 32 and data bytes 4–7 of the display data bus 22 map to memory bytes 4–7 in the odd memory bank 34 regardless of whether the access is above or below the watermark address.

Figure 4E:
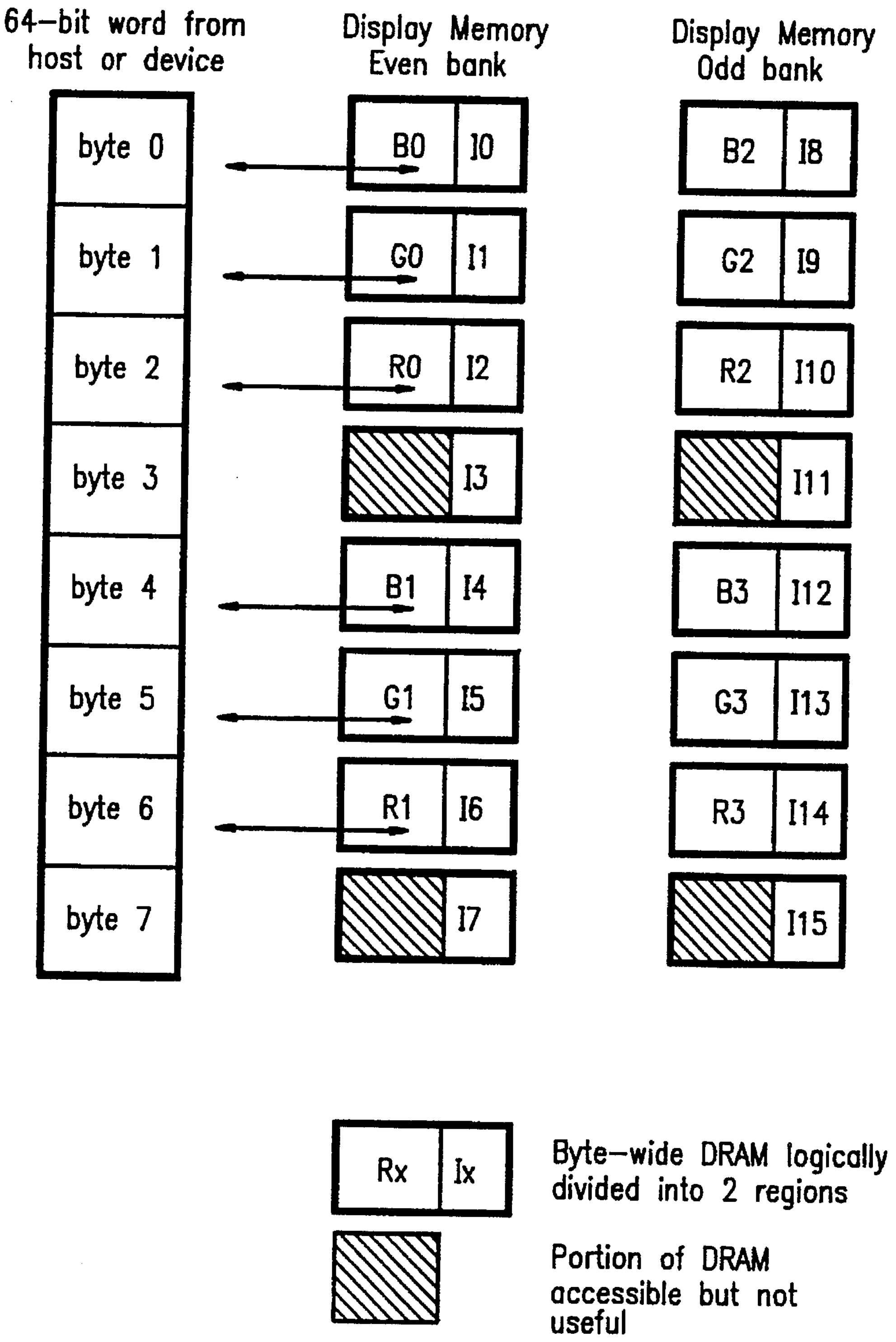
FIG. 4E provides a representation of a 64-bit read or write operation to a 24-bit pixel region in a conventional display memory system architecture.
Figure 4F:
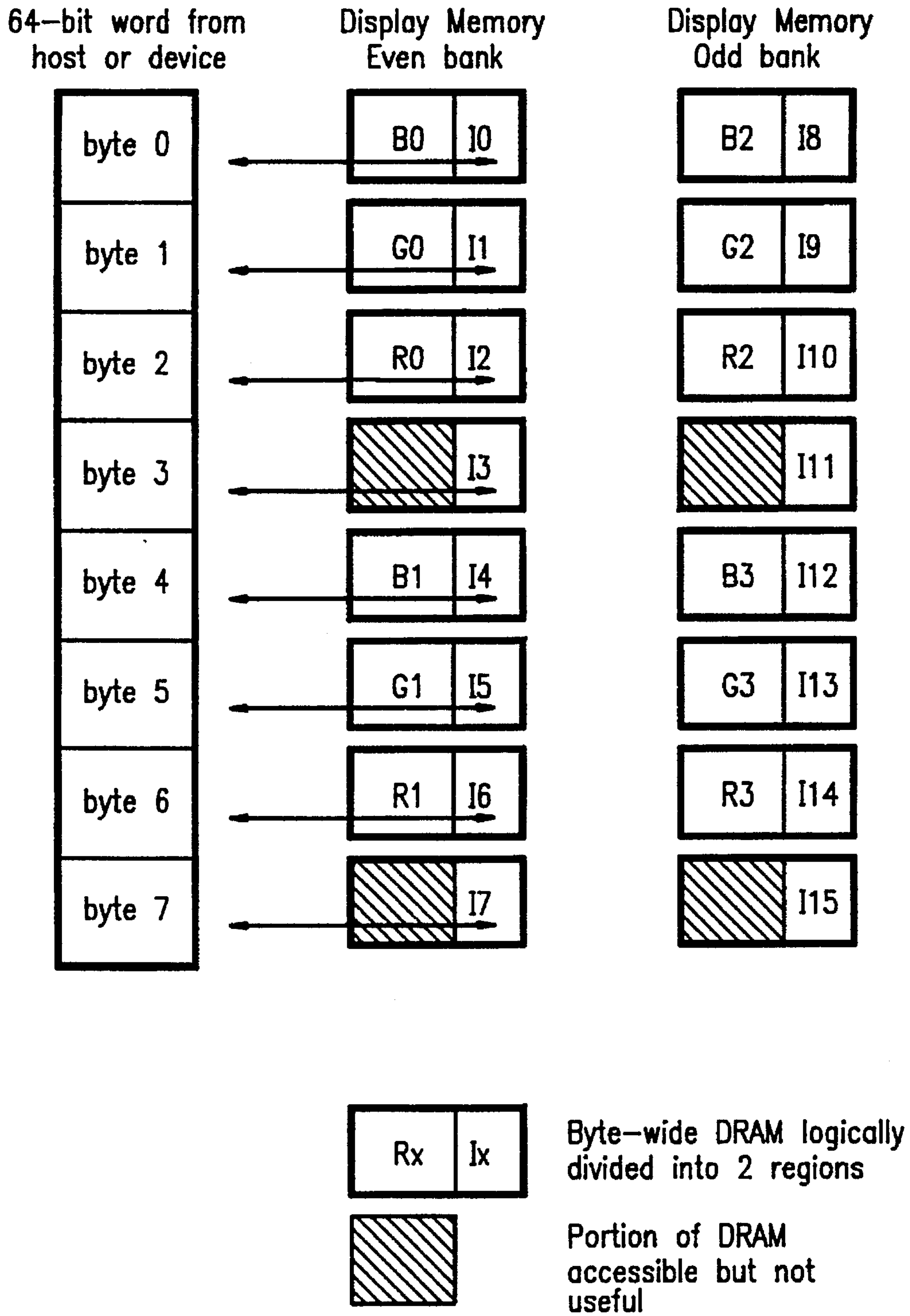
FIG. 4F provides a representation of a 64-bit read or write operation to a non-24-bit pixel region in a conventional display memory system architecture.

FIGS. 4E and 4F draw comparison between the concepts of the invention described above with respect to FIGS. 4A–4D and those of the conventional graphics system architecture. FIG. 4E shows a 64-bit read or write operation to a 24-bit pixel region in the conventional architecture. FIG. 4E shows accesses to even addresses. Accesses to odd addresses use the odd bank and are analogous to the foregoing discussion. In a single-bank implementation, all accesses are as described above.

FIG. 4F shows 64-bit read or write operations to a non-24-bit pixel region in the conventional architecture.

The RAM operating signals for performing read and write operations in the FIG. 3 system will now be discussed in conjunction with FIGS. 5A and 5B.

Referring to FIG. 5A, in the 24-bit write case discussed above, one of the two $\overline{WE}$ lines is asserted. All 64 MD lines may be driven even though 16-bits are "don't care" at any given time. The graphics controller 16 always re-arranges the outgoing bytes and byte-enable signals from RGB before transferring the pixel data to the display memory 20.

In the case of 24-bit writes to the even (or only) memory bank 32, the data sent on byte 4 of display data bus 22 is written out in memory byte 3, and the write mask corresponding to byte 4 is applied to byte 3. Memory bytes 4 and 7 are never written in the even memory bank 32. In this manner, one or two 24-bit pixels may be written concurrently.

For 24-bit writes to the odd memory bank 34 (used in the 64-bit bus configuration), data sent on byte 0 is written out in memory byte 7, and the write mask corresponding to byte 0 is applied to byte 7. Memory bytes 0 and 3 are never written in the odd memory bank 34. In this manner, one or two 24-bit pixels may be written concurrently.

Any write above the watermark address is assumed to be a non-24-bit write and is handled accordingly.

For writes above the watermark in a 32-bit bus configuration, a 32-bit write only is performed with data in memory bytes 0 though 3. Other MD lines may be driven. The $\overline{CAS}$ lines corresponding to memory bytes 4 through 7 may be asserted or not.

For writes above the watermark in a 64-bit configuration, a 64-bit write is performed with data on bytes 0 through 7. Both $\overline{WE}$ lines must be asserted. This will cause the data on bytes 1, 2, 5, and 6 of display data bus 22 to be written to the two memory banks (32 and 34) in parallel, though this is a harmless artifact since both DRAM banks will always contain the same data at locations above the watermark.

Any write below the watermark is assumed to be a 24-bit write and is handled accordingly.

With reference to FIG. 5A, in the 24-bit read case, one of the two $\overline{OE}$ lines is asserted. All 64 MD lines are driven by the DRAM even though at least 16-bits are "don't care" at any given time. The graphics controller 16 always re-arranges the incoming bytes to the RGB format before sending the data back to the device or to the host CPU 12.

In the case of 24-bit reads from the even (or only) memory bank 32, the data read in memory byte 3 is transferred to byte 4 of the display data bus 22. Data read in memory byte 4 is not returned to the device or host. Byte 3 of the display data bus 22 may return any value (including the data actually read in on byte 3) as it will be ignored in the 24-bit mode. In this manner, one or two 24-bit pixels may be read concurrently.

For 24-bit reads from the odd memory bank 34 (used in the 64-bit configuration), data read on byte 7 is returned on byte 0 of the display data bus 22. Data read in on byte 0 is not returned to the device or host. Byte 7 of display data bus 22 may return any value (including the data actually read in on byte 7) as it will be ignored in 24-bit mode. In this manner, one or two 24-bit pixels may be read concurrently.

For reads above the watermark in a 32-bit configuration, a 32-bit read only is performed with data on bytes 0 through 3 returned. Other MD lines will be driven by the DRAM but will be ignored by the device.

For reads above the watermark in a 64-bit configuration, a 64-bit read is performed with data on bytes 0 through 7. Both $\overline{OE}$ lines must be asserted. This will cause the data on bytes 1, 2, 5, and 6 to be read from two RAMs in parallel, though this is a harmless artifact since both DRAM banks will always contain the same data at locations above the watermark.

The actual circuitry included in the graphics controller 16 for (1) implementing dynamic reconfiguration of the display system 10 between the 24-bit RGB mode and the contiguous mode utilizing state bit 38 and (2) dynamically setting an access mode watermark utilizing watermark register 36 can consist of multiplexer circuits or equivalent logic circuits which map the physical display memory bytes to controller logic bytes according to the schemes described above. Implementation of these circuits in conjunction with conventional graphics controllers and DRAM display memory structures is well within the capabilities of one skilled in the art and, therefore, is not disclosed in detail in this document. The implementation would include addressing hardware that takes into account the differences in mapping between addresses below and above the watermark. One skilled in the art would recognize that, in the 24-bit mode (or byte steering mode), the host reads/writes to a 16 byte address space (only twelve of which carry the 24-bit RGB data), while in the non-24-bit mode (or direct mapping mode), the host reads/writes to an 8 byte address space (4 bytes of which may read and write identical data to two different physical locations).

The embodiment of the invention described above is an example of one special case. It is intended that the invention cover a method for automatically accessing a single memory system using either direct mapping or byte steering based on a control input. Alternate implementations can include other memory system sizes. The above discussion describes an implementation wherein similar mapping is used for a single-bank memory system, in which 1.5 MB is accessed as 48 bits for 24-bit modes, or 32 bits (with 16-bits unused) for other modes. In addition, while 256K×32 and 256K×64 are common graphics memory bank sizes, the concepts of the invention can extend to any memory depth or width. The inventive concept can also apply to other byte orderings. The particular mapping of R, G, B to bytes 0–7 is not an essential feature of the invention. Rather, the mapping of memory which is present to bytes which are required for the particular desired display mode is the essential concept. The concepts of the invention also apply to other selection methods between byte steered and direct mapping. The example described above shows a system in which a graphics controller maybe configured by a state bit for byte steered operation or direct mapping. When in the byte steered mode, accesses within a particular address range are mapped directly, while accesses outside the range are byte steered. The particular control mechanism for selecting whether to map a particular access in byte steered or direct fashion is not an essential feature of the invention. Rather, the ability to access the memory in both fashions is the inventive concept. Furthermore, the applicability of the present invention is not limited to graphics frame buffers systems, nor is it limited 24-bit architectures. Rather, the invention is intended to cover any system which may be configured to efficiently handle data at different bit widths with the same physical memory.

Thus, it should be understood that various alternatives to the embodiments of the invention described herein may be employed in practicing the invention. It is intended that the following claims define the scope of the invention and that methods and circuits within the scope of these claims and their equivalents be covered thereby.

What is claimed:

1. A method of mapping data transfers on a data bus connected between a controller and a memory storage element, the method comprising:

providing a control signal to the controller, the control signal that is selectively set to represent any one of a plurality of control values;

based upon the selected control value of the control signal, transferring data between the controller and the memory storage element in accordance with a data mapping protocol corresponding to the selected control value of the control signal; and providing a watermark value that delineates the memory storage element as including first and second sections, and wherein the data mapping protocol maps data transfers between the controller and the first section of the memory storage element in accordance with a first mapping mode and transfers data between the controller and the second section of the memory storage element in accordance with a second mapping mode.

2. A method of mapping data transfers on a display data bus connected between a graphics controller and a display memory storage element, the method comprising:

providing a control signal to the graphics controller, the control signal being set in either a first logic state or a second logic state;

in the event that the control signal is in the first logic state, transferring data between the graphics controller and the display memory storage element in accordance with a byte steering data mapping protocol; and in the event that the control signal is in the second logic state, transferring data between the graphics controller and the display memory storage element in accordance with a direct data mapping protocol.

3. A method as in claim 2 and further comprising:

providing a watermark value that delineates the display memory storage element as including first and second storage sections, and wherein data transfers between the graphics controller and the first section of the display memory storage element are mapped in accordance with the byte steering mapping mode and data transfers between the graphics controller and the second section of the display memory storage element are mapped in accordance with the direct mapping mode.

4. A data mapping system comprising:

a memory storage element;

a controller connected to the memory storage element via a data bus, the controller being responsive to an externally provided control signal that is selectively set to represent any one of a plurality of control values such that, based upon the selected control value of the control signal, data is transferred between the controller and the memory storage element in accordance with a data mapping protocol corresponding to the selected control value of the control signal; and a watermark register that stores a watermark value that delineates the memory storage element as including first and second storage sections, such that data transfers between the controller and the first section of the memory storage element are mapped in accordance with a first mapping mode and transfers between the controller and the second section of the memory storage element are mapped in accordance with a second mapping mode.

5. A pixel data mapping system comprising:

a display memory storage element; and a graphics controller connected to the display memory storage element via a data bus, the graphics controller being responsive to an externally provided control signal that is selectively set in either a first logic state or a second logic state, such that in the event that the control signal is in the first logic state, data is transferred between the graphics controller and the display memory storage element in accordance with a byte steering pixel data mapping protocol, and in the event that the control signal is in the second logic state, data is transferred between the graphics controller and the display memory storage element in accordance with a direct pixel data mapping protocol.

6. A method as in claim 5 and further comprising:

a watermark register that stores a watermark value that delineates the display memory storage element as including first and second storage sections, such that data transfers between the graphics controller and the first section of the display memory storage element are mapped in accordance with the byte steering mapping protocol and data transfers between the graphics controller and the second section of the display memory storage element are mapped in accordance with the direct mapping protocol.

7. A method of mapping a data transfer on a 64-bit display data bus connected between a graphics controller and a display memory storage element, the display data bus including eight contiguous 8-bit data paths (data bytes), the display memory storage element including even and odd memory banks each of which is divided into a pixel data storage region and a non-pixel data storage region, the even and odd memory banks including a plurality of 8-bit storage locations (memory bytes), the method comprising:

(a) for a data transfer operation between the graphics controller and an address in the pixel data storage region of the even memory bank, mapping six of the eight contiguous data bytes on the display data bus to six contiguous memory bytes in the even memory bank such that data bytes 0–2 map to storage bytes 0–2, data byte 4 maps to storage byte 3, and data bytes 5 and 6 map to storage bytes 5 and 6;

(b) for a data transfer operation between the graphics controller and an address in the pixel data storage region of the odd memory bank, mapping six of the eight contiguous data bytes on the display data bus to six contiguous memory bytes in the odd memory bank such that data byte 0 maps to storage byte and data bytes 1–6 map to storage bytes 1–6; and (c) for a data transfer operation between the graphics controller and an address in the non-pixel data storage region of the display memory storage element, mapping data bytes 0–3 of the display data bus to storage bytes 0–3 of the even memory bank and mapping data bytes 4–7 to storage bytes 4–7 of the odd memory bank.

8. A method as in claim 7 and including the further step of switching to a new display data bus mode wherein, in a data transfer operation between the graphics controller and an address in the pixel data storage region, data bytes 0–3 map to storage bytes 0–3 of the even memory bank and data bytes 4–7 map to storage bytes 4–7 of the odd memory bank.

* * * * *